(12) United States Patent
Borkar et al.

(10) Patent No.: US 8,696,869 B2
(45) Date of Patent: Apr. 15, 2014

(54) SURFACE APPLICATION OF POLYMERS AND POLYMER MIXTURES TO IMPROVE PAPER STRENGTH

(75) Inventors: Sachin Borkar, Wilmington, DE (US); Marc C. Putnam, Newark, DE (US)

(73) Assignee: Hercules Incorporated, Wilmington, DE (US)

( * ) Notice: Subject to any disclaimer, the term of this patent is extended or adjusted under 35 U.S.C. 154(b) by 618 days.

(21) Appl. No.: 12/940,197

(22) Filed: Nov. 5, 2010

(65) Prior Publication Data

US 2011/0112224 A1 May 12, 2011

Related U.S. Application Data

(60) Provisional application No. 61/258,646, filed on Nov. 6, 2009.

(51) Int. Cl.
| | | |
|---|---|---|
| *C08L 3/00* | (2006.01) | |
| *C08L 3/02* | (2006.01) | |
| *D21H 21/10* | (2006.01) | |
| *D21H 17/28* | (2006.01) | |
| *D21H 21/00* | (2006.01) | |
| *D21H 21/18* | (2006.01) | |
| *C08L 33/26* | (2006.01) | |

(52) U.S. Cl.
CPC ............ *D21H 21/00* (2013.01); *D21H 21/18* (2013.01); *C08L 33/26* (2013.01)
USPC .......... 162/168.3; 524/47; 524/812; 162/175; 106/145.1

(58) Field of Classification Search
CPC ......... D21H 21/10; D21H 17/28; D21H 1/00; C08L 3/00; C08L 3/02
USPC ................ 524/47, 812; 162/181, 168.3, 175; 106/145.1
See application file for complete search history.

(56) References Cited

U.S. PATENT DOCUMENTS

| | | |
|---|---|---|
| 2,721,240 A | 10/1955 | Weisgerber |
| 4,191,610 A | 3/1980 | Prior |
| 4,421,602 A | 12/1983 | Brunnmueller et al. |
| 5,242,545 A | 9/1993 | Bradway et al. |
| 5,281,307 A | 1/1994 | Smigo et al. |
| 5,543,446 A | 8/1996 | Rodriguez |
| 5,698,627 A | 12/1997 | Oguni et al. |
| 5,961,782 A | 10/1999 | Luu et al. |
| 6,159,340 A | 12/2000 | Niessner et al. |
| 6,294,645 B1 | 9/2001 | Allen et al. |
| 6,303,000 B1 | 10/2001 | Floyd et al. |
| 6,372,089 B1 * | 4/2002 | Keiser et al. ............... 162/181.6 |
| 6,616,807 B1 | 9/2003 | Dyllick-Brenzinger et al. |
| 6,797,785 B1 | 9/2004 | Hund et al. |
| 6,939,443 B2 | 9/2005 | Ryan et al. |
| 7,217,316 B2 | 5/2007 | Neale et al. |
| 7,482,417 B2 | 1/2009 | Kiyosada et al. |
| 2005/0150622 A1 * | 7/2005 | Hund et al. ................. 162/181.8 |
| 2005/0161183 A1 * | 7/2005 | Covarrubias ................. 162/158 |
| 2005/0287385 A1 | 12/2005 | Quick et al. |
| 2006/0060814 A1 | 3/2006 | Pawlowska et al. |
| 2008/0196851 A1 | 8/2008 | Hund et al. |
| 2009/0020249 A1 | 1/2009 | Propst, Jr. et al. |
| 2009/0043051 A1 | 2/2009 | Gu et al. |
| 2009/0277597 A1 * | 11/2009 | Hund et al. ................. 162/164.3 |
| 2010/0193148 A1 | 8/2010 | McKay et al. |

FOREIGN PATENT DOCUMENTS

| | | | |
|---|---|---|---|
| EP | 1824937 | | 4/2008 |
| FR | 2929964 | * | 5/2008 |
| WO | 2004027149 | | 4/2004 |
| WO | 2006027632 | | 3/2006 |
| WO | 2007000419 | | 1/2007 |

OTHER PUBLICATIONS

Anonymous: "Color Paper with Exceptional Reciprocity Performance," Research Disclosure, Mason Publications, Hampshire, GB, vol. 437, No. 13, Sep. 1, 2000, XP007126751, ISSN: 0374-4353 p. 49.
International Search Report, date Jul. 4, 2011, PCT/US2010/055567, pp. 2.

* cited by examiner

*Primary Examiner* — James J Seidleck
*Assistant Examiner* — Deve E Valdez
(74) *Attorney, Agent, or Firm* — Michael J. Herman; Joanne Rossi; Shaorong Chen

(57) ABSTRACT

Stable, coating compositions useful for enhancing the dry strength of paper are disclosed. The compositions comprise an aqueous solution of nearly neutral polymer, cationic polymer and starch. Method of using the coating composition to improve the dry strength of paper is also disclosed.

17 Claims, No Drawings

SURFACE APPLICATION OF POLYMERS AND POLYMER MIXTURES TO IMPROVE PAPER STRENGTH

This application claims the benefit of provisional application number U.S. 61/258,646, filed Nov. 6, 2009, the entire contents of which are hereby incorporated by reference.

FIELD OF THE INVENTION

This invention relates to surface applied strength additives for paper and a method for preparing these additives. Particularly, this invention relates to polymer compositions that comprise a blend of nearly neutral acrylamide polymer with a cationic polymer. Along with surface applied starch, these additives provide paper with excellent bursting strength, compression strength, and other such properties.

BACKGROUND ART

Economics and environmental necessity is driving the paper industry to increase their use of recycled fibers. Among the advantages of using recycled paper are cost savings, less refinement, easy availability, and environmental sustainability. However, increasing the number of passes through the recycling process makes the recycled fibers progressively shorter and more rigid resulting in decreases in pulp strength and also fiber-fiber bonding strength. Strength is an integral parameter for packaging grade paper. One way to recover the strength lost during the recycling process is through further refinement, but in case of recycled fibers the refining process has very limited window. Another approach is the utilization of strength chemicals during the paper making process. However, interference with recycled additives, uniform formation of paper, drainage, and productivity are the major factors that need to be taken into account.

Additives are added to the pulp slurry prior to sheet formation to improve machine runnability, productivity, and paper properties. These include wet and dry strength additives (e.g. cationic and anionic polyacrylamides, functionalized polyamides with epihalohydrin, polyvinylamines), retention and drainage aids (e.g. alum, polyethylenimines), defoamers, fillers that control pitch and stickies. Various sizing agents, such as rosin, alkyl ketene dimer (AKD), or alkyl succinic anhydride (ASA) that impart hydrophobic properties are also added.

Common wet end additives for enhancing dry strength of the finished sheet are starch or guar gum. The modification of starch to improve its performance has been well documented. The choice and type of the starch for strength application varies from region to region and is dependent on its cost and availability. (See "Starch and Starch Products in Paper Coating," R. L. Kearney and H. W. Maurer, Ed. 1990).

Cross-linking starch to improve its strength enhancing properties has been employed. For example, Huang et al. describe the use of boron containing compounds to crosslink starch during the paper making process, resulting in improved physical and mechanical properties (WO 2004/027,149 A1). The cross-linked starch composition comprises a reaction product formed by reacting starch slurry with boric acid or zinc borate during the gelatinization process.

U.S. Pat. No. 6,303,000 granted to Floyd et al., discloses gelatinized starch compositions cross-linked with a glyoxal resin and the use of same in papermaking. During the starch gelatinization process, starch is reacted with blocked glyoxal which results in starch cross-linking and this mixture is added to the pulp slurry before sheet formation. The limitation of these particular starch cross-linking compounds is that compression strength can be improved, whereas resistance to puncture tends to suffer.

Strength additives that are added at the wet end to improve paper strength, especially in paper made from recycled fibers, include amphoteric acrylamide based polymers and coacervate technology. An example of the former is described in U.S. Pat. No. 5,698,627, issued to Oguni, which teaches the synthesis of acrylamide based amphoteric copolymers that improve freeness, retention, and dry strength of recycled corrugated base paper. An example of coacervate technology is described in U.S. Pat. No. 6,294,645. This wet end dry strength system is comprised of a low charge polyamidoamine-epichlorohydrin and an anionic polyacrylamide, added sequentially to a pulp slurry.

Polyvinylamine has been utilized as a dry and wet strength additive, and a retention and drainage aid in the papermaking process. Due to high density of amine functionality, this polymer possesses higher charge density and ultimately has enhanced hydrogen bonding between cellulose fiber and the polymer chain. Weisgerber et al. in U.S. Pat. No. 2,721,140 disclose the use of polyvinylamine, prepared by the hydrolysis of polyvinyl N-phthalimide, as a wet strength additive for paper making. U.S. Pat. No. 5,961,782 issued to Luu et al., discloses use of polyvinylamine to make crosslinkable creping adhesive formulations. Niessner et al, in U.S. Pat. No. 6,159,340, discloses the use of polyvinylamine as dry and wet strength additives in paper and paperboard production. U.S. Pat. Nos. 4,421,602, 6,616,807 and 6,797,785 disclose use of polyvinylamines as drainage aids, flocculants, and retention aids in the paper making process.

Interference with excess anionic trash coming via recycling process coupled with poor fiber quality demands significantly increased additive levels. In addition to high cost, wet end additives reach a plateau performance, that is, further chemical does not provide increased performance. Practitioners of paper making have overcome these limitations by applying additives after paper formation. Employed techniques include metered size press, puddle size press, spray, roll coater, blade water, and air knife coater. Coating or surface sizing additives commonly employed are polyacrylic emulsions, poly(styrene-co-butadiene) emulsions with various particle sizes, poly(vinylacetate), and polyvinyl alcohol. Because these additives have good film forming properties, they typically are used to impart a certain amount of resistance to various liquids. An example of this approach is provided in European Patent 1,824,937.

The most commonly applied surface additive is starch. Excess use of starch may have negative impacts on other paper properties, like fold cracking, and also productivity, for example higher energy drying. Since size press application of starch is an on-machine operation, any problem which interferes with operation of the size press has the potential to interfere with operation of the entire paper machine.

The amount of starch that can be applied during size press treatment of a paper sheet (i.e., the wet pick up of the sheet) is dependent on the size press conditions, the viscosity of the starch solution and the penetration of starch solution into the paper sheet (U.S. Pat. No. 4,191,610 issued to Prior). Modification of size press starch usually introduces functionality to the starch molecule, and can decrease its viscosity. The maximum amount of modified starch that can be economically and practically applied during size press treatment is about 10 g/m$^2$ and for unmodified or native or high viscosity starch the maximum is 5 g/m$^2$. U.S. Pat. No. 5,242,545 discloses running the size press treatment at higher temperature and increasing size press nip pressure, the starch loading can be increased to 17-20 g/m². Further, WO 2006/027,632 A2 teaches that lignosulfonate, contained in the black liquor waste stream of a typical pulping process, can be mixed with starch to lower the size press solution viscosity and allows application of a higher solid content on paper during size press treatment, helping to conserve energy during sheet drying process.

U.S. Pat. No. 7,217,316 teaches a process of oxidizing protein flour sourced from plants to produce a coating composition for improving strength in paper. While the strength performance of the disclosed composition shows improved efficiency over starch or oxidized starch, levels of the coating composition described for said effect are 6-12 g/m².

U.S. Pat. No. 5,281,307 issued to Smigo, discloses the use of vinylalcohol and vinylamine copolymer crosslinked using glyoxal for dry end application. The submerging of Whatman filter paper in polymer solution and subsequent drying shows improvement in paper properties.

Of the aforementioned wet end strength additives many have found utility at the dry end. Whereas the components of a wet end strength system are added sequentially to a slurry of pulp, which moderates potential incompatibilities between components, each component of a surface applied strength additive system needs to be combined into a single, stable solution. As starch is almost always a component of a dry strength system, other components need to exhibit solution stability when combined with starch, i.e. no precipitation, no gel formation, or severe viscosity increases. Glyoxal releasing chemicals and glyoxal containing polymers would be expected to be compatible as their cross linking activation typically requires temperatures not encountered until the drying section of a paper machine (U.S. Patent Application 2005/0161182 A1). Another example of cross linking dry strength additives is disclosed in U.S. Patent application 2009/0020249 wherein the surface application of poly(acrylic acid) with inorganic substances, e.g. zinc oxide, is described. U.S. Patent Application 2005/0287385 discloses styrene-butadiene latex coating composition that provides enhanced compression strength when applied to already formed, substantially dry paper. U.S. Pat. No. 7,482,417 discloses a surface applied dry strength agent comprised of an amphoteric acrylamide copolymer. When the surface applied starch is anionic, combination with highly cationic, dry strength agents, for example polyvinylamine, a precipitate, or gel may form.

BRIEF DESCRIPTION OF THE INVENTION

The present invention relates to a stable dry strength composition and its application to an already formed paper substrate. Specifically the coating composition is comprised of: component A nearly neutral polyacrylamide, component B a cationic polymer prepared from monomers bearing amine functionality, and component C starch. The nearly neutral acrylamide polymer is a copolymer with less than 5 molar percent of anionic functionality or less than 5 molar percent of cationic functionality. The cationic polymer is prepared from vinyl monomers bearing amine functionality or vinyl monomers containing nascent amine functionality. The starch component of this composition may be native or modified and obtained from a variety of natural plant sources. A process for making paper with improved dry strength, using the coating composition is also described.

Component B can prepared from a vinyl or allyl monomer bearing amine functionality.

DETAILED DESCRIPTION OF THE INVENTION

The present invention provides compositions, that when applied to a formed paper substrate; enhance the dry strength of said article. The composition comprises a stable blend of one or more polymers, at least one of which may be a charged polymer, with starch. Specifically, the composition contains component A, an acrylamide based nearly neutral polymer, component B, a cationic polymer prepared from a monomer bearing amine functionality, and component C starch, either native or derivatized.

In one preferred embodiment the component B, cationic polymer, is prepared from a vinyl monomer bearing amine functionality.

What is meant by a nearly neutral acrylamide polymer is a nonionic to slightly anionic or slightly cationic acrylamide copolymer. The polymer contains less then 5 molar percent of anionic monomers, preferably less than 3 molar percent, preferably less than 2 molar percent, most preferably less than 1 molar percent. The amount of anionic functionality in the nearly neutral polyacrylamide is known from the amount of anionic monomer added during the polymerization or by analysis of copolymer or partial hydrolysis of polyacrylamide. Alternatively, the acrylamide based nearly neutral contains less then 5 molar percent of cationic monomers, preferably less than 3 molar percent, more preferably less than 2 molar percent, most preferably less than 1 molar percent.

In one preferred embodiment the nearly neutral acrylamide polymer is anionic.

The preparation of acrylamide based homopolymers and copolymers with functional vinyl monomers are well known to those skilled in the art. Radical polymerization of acrylamide by a method using initiating system that generates free radicals is well known and documented. Two classes of commonly utilized radical polymerization initiators are preferred for use in preparing the disclosed composition; thermal, homolytic dissociation and reduction-oxidation initiators. The former category includes azo or peroxide containing initiators, for example 2,2'-azobis(2-methylpropionamidine) dihydrochloride, 2,2'-azobis(2-methylpropionitrile), benzoyl peroxide, tert-butyl hydroperoxide, and tert-butyl peroxide. The latter category includes combinations of oxidants (persulfate salts, peroxides, and percarbonate salts) with appropriate reductants, such as ferrous or sulfite salts. A method of obtaining acrylamide containing polymers and copolymers of molecular weight and polydispersity suitable for use in this invention is disclosed for example U.S. Pat. No. 5,543,446 and U.S. Pat. No. 6,939,443. The anionic charge of the compositions disclosed in these references is, however, too great to be suitable for this invention.

Suitable nearly neutral acrylamide based polymers for component A encompass a range of molecular weights from 5000 to about 500,000 Daltons, preferably 10,000 to about 300,000, preferably from about 30,000 to about 300,000 Daltons, preferably from about 30,000 to about 150,000 Daltons, preferably from about 50,000 to about 130,000 Daltons.

The nearly neutral polymer is an acrylamide based homopolymer or a partially hydrolyzed acrylamide homopolymer or a copolymer with anionic component having at most 5 molar percent of anionic functionality and is chosen to prohibit viscosity buildup or gelation observed when various highly cationic dry strength agents are combined with anionic starch. While the mechanism of stabilization has not been elucidated, without wishing to be bond by theory, it is proposed that certain nearly neutral acrylamide based polymers can complex with cationic polymers when in the presence of starch. This complexation can moderate hydrogen bonding and ionic interactions between cationic polymer and anionic starch that would otherwise lead to viscosity buildup. While separate, wet end addition of anionic starch and cationic polymer has been employed by papermakers to improve dry strength, the interactions between these materials that cause viscosity build up has limited their utilization as a dry end system where polymer and starch concentrations are greater. This invention allows for the system to be applied at the dry end of a papermaking process, providing all the attendant advantages to the papermaker. Additionally, without wishing to be bound by theory, it is proposed that upon drying, component A and component B can strongly interact with component C due to the increased solids.

Nearly neutral polymers suitable for this invention may be prepared via any of the aforementioned methods. Neutral monomers from which component A may be prepared include but are not limited to, acrylamide, (meth)acrylamide, N-methyl(meth)acrylamide, N-ethyl(meth)acrylamide, N-isopropyl(meth)acrylamide. Acrylamide is the preferred monomer.

Anionic monomers from which component A may be prepared include but are not limited to, acrylic acid, methacrylic acid, 2-acrylamido-2-methylpropane sulfonic acid, 4-styrenesulfonic acid, and 4-vinylbenzoic acid and their salts. Acrylic acid and its salts being the preferred monomer.

Other suitable monomers that introduce a beneficial cross linked structure into the non-ionic or nearly neutral acrylamide based polymer may be used. These include, but are not limited to, ethylene glycol di(meth)acrylate, diethyleneglycol di(meth)acrylate, methylenebisacrylamide, methylene-bis-(meth)acrylamide, ethylene-bis-(meth)acrylamide, and hexamethylene-bis-(meth)acrylamide. These may be used in an amount of less than 1 molar percent, preferably less than 0.3 molar percent.

Suitable cationic polymers for component B encompass a range of molecular weights from 10,000 to about 1,000,000 Daltons, preferably 50,000 to about 600,000 Daltons, preferably 50,000 to about 400,000 Daltons, more preferably in the range of from 200,000 to about 350,000 Daltons. The extent of cationicity for suitable polymers can be defined by charge density method. The charge densities (Mutek) of the ionized polymers in the present invention are measured at pH 8.0 using a colloid titration method. Charge density (meq/g) is the amount of cationic charge per unit weight, in milliequivalents per gram of product solids. Cationic polymers of the described invention have charge densities, on a solids basis, in the range of 1.00 to 12.00 meq/g, preferably in the range of 3.50 to 8.50 meq/g, more preferably from 5.50 to 8.50 meq/g.

Preferred cationic monomers used to prepare component B can be vinyl or allyl functionality containing monomers. These include but are not limited to, dimethylaminoethyl (meth)acrylate, diethylaminoethyl(meth)acrylate, dimethylaminopropyl(meth)acrylate, diethylaminopropyl(meth)acrylate, [2-(Methacryloyloxy)ethyl]trimethylammonium chloride, [3-(Methacryloylamino)propyl]trimethylammonium chloride, [2-(Acryloyloxy)ethyl]trimethylammonium chloride, [3-(Acryloyloxy)propyl]trimethylammonium chloride, N,N-dimethylamino propyl(meth)acrylamide, dialkyldiallylamine, diallylamine, dialkylallylamine, and allylamine.

Non-ionic monomers including but not limited to, acrylamide, (meth)acrylamide, N-methyl(meth)acrylamide, N-ethyl(meth)acrylamide, and N-isopropyl(meth)acrylamide, may be copolymerized with the aforementioned cationic monomers to provide suitable polymers for component B of this invention.

More preferably component B is a vinylamine containing polymer. Monomers used to prepare the component B vinylamine containing polymers are monomers that can provide cationic charge upon full or partial hydrolysis, examples include, but are not limited to N-vinyl formamide, N-vinyl acetamide, and vinyl N-phthalimide. Before hydrolysis, the vinylamine containing polymer employed for component B can be a copolymer, but preferably is a homopolymer. The extent of hydrolysis for this class of component B is between 20 and 100%, preferably in the range of 25 to 85%, and most preferably in the range of 25 to 70%. Another class of vinylamine containing polymers useful in the invention can be derived from Hofmann rearrangement of polyacrylamide as described, for example in US patent application 2008/0196851. A further class of vinylamine containing polymer suitable for use in this invention is described in US Patent Applications 2009/0043051 and 2010/0193148. These polymers are poly(vinylamine) substituted with various cationic functional groups.

Other suitable monomers that introduce a beneficial cross linked structure into component B, the cationic polymer may be used. These include, but are not limited to, ethylene glycol di(meth)acrylate, diethyleneglycol di(meth)acrylate, methylenebisacrylamide, methylene-bis-(meth)acrylamide, ethylene-bis-(meth)acrylamide, and hexamethylene-bis-(meth) acrylamide. These may be used in an amount of less than 1 molar percent, preferably less than 0.3 molar percent.

Component C, starch is selected from the group consisting of corn starch, rice starch, potato starch, wheat starch, and tapioca starch. The starches may be unmodified or modified in any of the following manners oxidation, enzymatic degradation, and cationization.

Component A and B are preferably premixed prior adding to starch. The mixture of component A and B is preferably added to precooked starch slurry or alternatively added before gelatinization process. The preferred starch type for this invention is oxidized starch.

Other components may be added to stabilize the composition and reduce viscosity build up. Useful materials are anionic, cationic, or neutral surfactants such as fatty acids, oxyethylated alkylphenols, alkyl amine oxides, alkyl sulfosuccinates, lignosulfonate, alkyl sulfates. Examples of some useful viscosity modifying components include urea and salts such as sodium sulfate, sodium chloride, potassium chloride, potassium iodide.

In one embodiment the paper coating composition comprises component A (a nearly neutral polyacrylamide); component B (a cationic polymer); component C (starch), and component A is anionic; the ratio of component A to component B is from 99:1 to 80:20, preferably 98:2 to 90:10, wherein the ratio of component A plus component B to starch is from 1:105 to 1:1, preferably 1:20 to 1:7; wherein component B is prepared from a vinyl or allyl monomer bearing amine functionality, preferably vinyl; wherein the molecular weight of component A is from 30,000 to about 300,000 Daltons, preferably from 30,000 to 150,000; wherein the molecular weight of component B is from 50,000 to about 600,000 Daltons, preferably from 50,000 to about 400,000 Daltons and wherein the viscosity of the composition is less than 1000 centipoise at a temperature of 60° C., preferably less than 500 centipoise.

A process for making paper with improved dry strength is contemplated by this invention. The process comprises applying to already formed paper the composition of the invention. The composition comprises component A an anionic to neutral polyacrylamide, component B a cationic polymer prepared from a monomer bearing amine functionality, and component C, starch.

In one preferred embodiment component B is prepared from a vinyl monomer bearing amine functionality.

The composition is generally applied at the dry end of a papermaking machine.

This invention can be applied to any of the various grades of paper that benefit from enhanced dry strength including bag, boxboard, copy paper, container board, corrugating medium, file folder, newsprint, paper board, packaging board, printing and writing, and publication. These paper grades can be comprised of any typical pulp fibers including groundwood, Kraft, sulfate, mechanical, and recycled. The invention can be applied through any method of chemical treatment to already formed paper including metered size press, puddle size press, spray, roll coater, blade coater, and air knife coater.

In a preferred embodiment of the present invention, the amount of each of the employed components A, B and C should be determined by fully considering performance and solution stability of the resulting paper coating composition. The ratio of components A:B may be 99:1 to 70:30, preferably 98:2 to 85:15, and even more preferably 98:2 to 90:10. The total amount of component A plus component B to starch may be present in a ratio of 1:105 to 1:1, preferably 1:52 to 1:2, and more preferably 1:20 to 1:7 and preferably 1:15 to 1:7. Component A and B can be added separately to the starch, or as in the preferred embodiment, premixed prior to adding to the starch. The aqueous composition is prepared by combining component C and component A and B. Preferably the two polymers are thoroughly mixed together prior to addition to the cooked, diluted starch solution. The total amount of surface additive would be the minimum amount required to obtain the desired strength performance in the paper. Typical coat weights of polymer and starch may range from 1 to 10 grams, preferably from 2 to 8 grams, and preferably from 2 to 5 grams of additive per square meter of paper.

Essential to the function of this invention is its solution stability, referring to the absence of precipitates, coagulates, or gels which can lead to deposition on the paper machine during the course of use. Also the coating composition requires a viscosity such that it can be pumped onto the paper machine and spread over the substrate surface. The preferred viscosity of the final solution, under conditions of use, is in the range of 10-1000 cPs, preferably between 10-500 cPs, and more preferably between 10-200 cPs. The temperature at the point of application is between 40-80° C., preferably between 40 to 70° C., and more preferably between 50 to 65° C. It is preferred that at 60° C. the viscosity is less than 1000 cPs, more preferably less than 500 cPs, more preferably less than 200 cPs.

In one preferred embodiment of the process, component B is prepared from a vinyl or allyl monomer bearing amine functionality, preferably vinyl; the molecular weight of component A is from 30,000 to about 300,000 Daltons, preferably from 30,000 to 150,000; the molecular weight of component B is from 50,000 to about 600,000 Daltons, preferably from 50,000 to about 400,000 Daltons; and the viscosity of the composition is less than 1000 centipoise at a temperature of 60° C., preferably less than 500 cPs.

In order to accommodate the paper making system, the paper coating composition may have its pH adjusted. This may be affected with any of the following non limiting, compounds: hydrochloric acid, sulfuric acid, acetic acid, citric acid, ammonium hydroxide, sodium bicarbonate, sodium hydroxide, or potassium hydroxide.

The following examples further explain the invention and demonstrate that addition of above described composition offer significant dry strength improvement when applied to paper substrates. The examples and data presented below better illustrate the benefits of the claimed invention and are not meant to be limiting.

Experimental

General Procedure for Paper Treatment

A solution consisting of cooked (90° C., 40 min) modified tapioca starch and dry strength product was added to the nip between a single butyl rubber roll and a single steel roll pressed together at 40 psi. Sheets of paper were passed through the puddle to providing uniform coating. Sheets with higher basis weights were passed twice through the size press roll to ensure uniform wetting of the sheet and achieve desired starch and additive loading. The test samples were immediately dried between the felt and steel of a rotating drum-type drier under conditions which provided a final sheet moisture content of 5-7%. The concentration of starch and dry strength additives were varied to obtain each targeted weight pick up level by the paper. The treated paper samples were then conditioned (70° F., 50% humidity, at least 24 hours) and tested.

Paper Testing

Mullen Burst (Mullen) (TAPPI T-403): This test was used to measure the bursting strength or puncture resistance of the paper samples. The preconditioned test sample was securely clamped between two metal rings of B. F. Perkins Model C Mullen Tester completely covering the rubber diaphragm. A clutch lever is placed in forward position to apply hydrostatic pressure, expanding a rubber diaphragm until the paper sample bursts. When the test specimen bursts, the lever is moved to reverse position and burst strength is recorded in $lb/in^2$.

Ring Crush Test (RCT) (TAPPI T-822): This test was used to measure the compression strength of the paper samples. Lorentzen & Wettre Crush Tester is utilized to perform this test. From the treated samples, strips of 152.4 mm×12.7 mm are cut using a die. The strip is slide into the sample holder which keeps the sample in a ring shape. The sample holder is placed on the lower platen. A load, at a constant speed of 12.5 mm/min, is applied until the sample fails and this load is recorded in lbf/6 in. Five replicates each are performed in the cross and machine direction. Final reported value is geometric mean of cross and machine direction value.

Example 1

A nitrogen purged jacketed resin kettle fitted with a mechanical stirrer, water jacketed condenser, nitrogen inlet, thermocouple and two addition ports, was charged with 727 gram of deionized water and 1 weight % solution of cupric sulfate in deionized water (the amount of cupric sulfate in polymer solution was adjusted to have 30 ppm of copper based on acrylamide) The reactor contents were degassed with nitrogen for 1 hour. Monomer and initiator solutions were prepared separately: a monomer solution of 500 g acrylamide (50 wt % aqueous solution) and 0.18 g N,N-methylenebisacrylamide (MBA), and an initiator solution of 30.0 g ammonium persulfate (1.0 wt. % solution), and 30.0 g sodium metabisulfite (0.83 wt. % solution.) With the reactor contents at 65° C., the monomer and initiator solutions were feed simultaneously and separately to the reactor over a period of 2 hours. After complete addition the temperature was maintained at 65° C. and the reaction was continued for an additional 2 hours. The polymerization was quenched by cooling the kettle to 25° C. The Brookfield viscosity was 697 cPs (LV unit, spindle #2, 60 rpm, 25° C., used 4 oz jar) and the reduced specific viscosity (1 wt. % in $NH_4Cl$) was 0.74 dL/g. Molecular weight, as determined by gel permeation chromatography, was 71,500 Daltons. Examples 1-2 through 1-7 were synthesized, wherein the equivalents of initiator was varied to effect a change in molecular weight. By increasing the initiator concentration, the resulting polymer molecular weight can be lowered; a technique well known to those skilled in the art. These polyacrylamides are described in Table 1.

TABLE 1

Properties of polyacrylamide (component A) with different molecular weight and architecture

| Examples | MBA (mol %) | Brookfield viscosity (cPs) | Reduced specific viscosity (dL/g) | % Active | SEC $M_w$ (Daltons) |
|---|---|---|---|---|---|
| 1-1 | 0.033 | 70 | 0.32 | 21.36 | 52,900 |
| 1-2 | 0.033 | 348 | 0.58 | 21.24 | 110,000 |
| 1-3 | 0.033 | 697 | 0.74 | 21.33 | 71,500 |
| 1-4 | 0.033 | 1050 | 0.94 | 19.50 | 170,000 |
| 1-5 | — | 150 | 0.72 | 14.90 | — |
| 1-6 | — | 1230 | 0.84 | 21.72 | 78,700 |
| 1-7 | — | 777 | 0.77 | 21.09 | 71,100 |

Example 2

Everything was conducted in the same manner as in Example 1, except adding the amount of anionic comonomer, acrylic acid, shown in Table 2, to the feed. Table 2 shows the properties of the resulting anionic acrylamide copolymer.

TABLE 2

Properties of acrylamide and acrylic acid copolymer

| Examples | MBA (mol %) | Acrylic Acid (mol %) | Brookfield viscosity (cPs) | Reduced specific viscosity (dL/g) | % Active | SEC $M_w$ Daltons |
|---|---|---|---|---|---|---|
| 2-1 | 0.033 | 2 | 879 | 0.73 | 19.38 | 147,000 |
| 2-2 | 0.033 | 4 | 1157 | 0.81 | 19.21 | 166,000 |

Example 3

Mixtures of polyacrylamide and polyvinylamine or modified polyvinylamine were prepared by mixing the various polyacrylamides of examples 1 and 2 with either polyvinylamine or modified polyvinylamine. In a typical experiment, a 4 oz. jar was charged with 100 g of polyacrylamide (PAM) polymer solution as prepared in Example 1 or 2, to this an amount of a polyvinylamine solution was added. These polyvinylamine solutions (Hercobond® 6330 and Hercobond® 6350 paper performance additives, available from Ashland Incorporated) were derived from a poly(N-vinylformamide) hydrolyzed by using various molar ratios of sodium hydroxide (NaOH) to N-vinylformamide (VFA) as shown in Table 3. The preferred range for hydrolysis of poly(N-Vinylformamide) is 20 to 100 molar percent, preferably 25 to 80 molar percent, and more preferably 25 to 70 molar percent. The mixture of polymers was shaken over Lab Line® Orbit Environ Shaker for 1 h at 25° C.

TABLE 3

Type and ratio of copolymers employed to prepare a blend of polyacrylamide and polyvinylamine

| | Component A | | Component B | |
|---|---|---|---|---|
| Examples | PAM Designation | Wt % | Theoretical Hydrolysis | Wt % | Molar ratio VFA:NaOH |
| 3-1 | Example 1-1 | 95 | 50% | 5 | 1.0:0.51 |
| 3-2 | Example 1-2 | 95 | 50% | 5 | 1.0:0.51 |
| 3-3 | Example 1-5 | 99 | 30% | 1 | 1.0:0.34 |
| 3-4 | Example 1-5 | 98 | 30% | 2 | 1.0:0.34 |
| 3-5 | Example 1-5 | 95 | 30% | 5 | 1.0:0.34 |
| 3-6 | Example 1-5 | 90 | 30% | 10 | 1.0:0.34 |
| 3-7 | Example 1-3 | 95 | 50% | 5 | 1.0:0.51 |
| 3-8 | Example 1-3 | 95 | 100% | 5 | * |
| 3-9 | Example 1-4 | 95 | 50% | 5 | 1.0:0.51 |
| 3-10 | Example 1-6 | 98 | 50% | 2 | 1.0:0.51 |
| 3-11 | Example 1-6 | 95 | 50% | 5 | 1.0:0.51 |
| 3-12 | Example 1-7 | 95 | 50% | 5 | 1.0:0.51 |
| 3-13 | Example 2-1 | 95 | 50% | 5 | 1.0:0.51 |
| 3-14 | Example 2-2 | 95 | 50% | 5 | 1.0:0.51 |
| 3-15 | Example 1-3 | 99 | 50% | 1 | 1.0:0.51 |
| 3-16 | Example 1-3 | 98 | 50% | 2 | 1.0:0.51 |
| 3-17 | Example 1-3 | 99 | 30% | 1 | 1.0:0.34 |
| 3-18 | Example 1-3 | 98 | 30% | 2 | 1.0:0.34 |
| 3-19 | Example 1-3 | 95 | 30% | 5 | 1.0:0.34 |

*Poly(vinylamine) of Example 3-8 was reacted with 3-chloro-2-hydroxypropyl-trimethylammonium chloride (Quat) and succinic anhydride (SA) at a molar ratio of 1.0:0.25:0.04 VFA:Quat:SA.

Example 4

ExcelSize® 15 (from Siam Modified Starch Co., Ltd. Pathumthani, Thailand) starch, an oxidized tapioca starch, was solublized by preparing a 15 wt % aqueous slurry and then mixing the slurry at 90° C. for 40 minutes. The solution was brought to 60° C. and diluted with water at 60° C. to 8.25 wt %. Various amount of polymer or polymer blend was added, solution temperature was held at 60° C. and Brookfield (spindle 1/100 rpm) viscosities were determined at various time intervals. Results are set out in Table 4, demonstrating that coating compositions of this invention can be brought to a suitable viscosity with modifying agents.

TABLE 4

Effect of additive and its addition level on viscosity of starch solution

| | | | | | Brookfield viscosity (cPs) | | | | |
|---|---|---|---|---|---|---|---|---|---|
| Example | Sample | Wt % | Additive 2 | Wt % | 5 min | 20 min | 40 min | 60 min | 120 min |
| 4-1 | Ex 3-7 | 0.75 | — | — | 20.1 | 20.6 | 19.1 | 18.7 | 20.3 |
| 4-2 | Ex 3-7 | 1.50 | — | — | 1632 | 1818 | 1956 | 2406 | 2675 |
| 4-3 | Ex 3-7 | 1.50 | CLS | 2.00 | 15.1 | 14.4 | 13.1 | 13.4 | 12.5 |

CLS = calcium lignosulfonate

Example 5

Utilizing the above described paper application method, a blend of polyacrylamide and polyvinylamine was evaluated for effect on sheet strength. All runs, except the 5-1, contained 3 g/m² ExcelSize 15 in the size press solution. As shown in Table 5, blending polyvinylamine into polyacrylamide provides a significant increase in strength over that achievable by polyacrylamide alone (Comparative Example 5-3) whereby greater strength can be obtained at significantly lower addition level. At higher addition levels, the observed benefit in dry strength can diminish as shown in example 5-5.

TABLE 5

Effect of acrylamide based additives on dry strength of recycled linerboard. Basesheet obtained from JinCang paper mill, made using Chinese old corrugated cardboard furnish, Basis Weight = 100 g/m², Caliper 7.4 mil, ExcelSize 15 = Oxidized Tapioca starch

| | | | Strength data | |
|---|---|---|---|---|
| Examples | Starch (g/m²) | Additive | Addition (g/m²) | Mullen (lb/in²) | RCT (lbf/6 in.) |
| 5-1 No Starch | — | — | — | 19.0 | 21.3 |
| 5-2 | 3.00 | — | — | 24.2 | 29.1 |
| Comp. 5-3 | 3.00 | 1-3 | 0.50 | 27.6 | 33.1 |
| 5-4 | 3.00 | 3-7 | 0.15 | 31.0 | 33.3 |
| 5-5 | 3.00 | 3-7 | 0.30 | 27.0 | 28.9 |

Example 6

Utilizing the above described paper application method, a blend of polyacrylamide and polyvinylamine was evaluated for effect on sheet strength using the same basesheet as in Example 5. All runs, except the 6-1, contained 2.12 g/m² ExcelSize 15 in the size press solution. As shown in Table 6A the best results are achieved when crosslinked polyacrylamide of approximately 100 000 Dalton molecular weight (6-14 through 6-16) is used as component A. Other crosslinked polyacrylamides as component A provided overall strength that was greater than that obtained by component A being non-crosslinked polyacrylamides (6-17 through 6-19); although the latter do provide an enhancement in dry strength over starch alone. Table 6B demonstrates the advantage of using anionic polyacrylamide as component A to enhance dry strength although the effect is typically less than that obtained with nonionic polyacrylamide as component A.

TABLE 6A

Effect of non anionic polyacrylamide molecular weight, architecture and its ratio in blend with polyvinylamine on dry Strength of recycled linerboard; Basesheet obtained from JinXin paper mill, made using Chinese old corrugated cardboard furnish, Basis Weight = 106 g/m², Caliper 6.3 mil, ExcelSize 15 = Oxidized Tapioca starch

| | | | | Strength data | |
|---|---|---|---|---|---|
| Examples | Starch (g/m²) | Additive | Addition (g/m²) | Mullen (lb/in²) | RCT (lb/6 in) |
| 6-1 No Starch | — | — | — | 21.5 | 16.9 |
| 6-2 | 2.12 | — | — | 24.9 | 19.1 |
| 6-3 | 2.12 | 3-7 | 0.04 | 26.5 | 24.3 |
| 6-4 | 2.12 | 3-7 | 0.16 | 29.2 | 23.1 |
| 6-5 | 2.12 | 3-8 | 0.04 | 28.8 | 22.8 |
| 6-6 | 2.12 | 3-8 | 0.08 | 28.7 | 23.1 |
| 6-7 | 2.12 | 3-8 | 0.16 | 29.7 | 22.7 |
| 6-8 | 2.12 | 3-1 | 0.04 | 27.1 | 22.5 |
| 6-9 | 2.12 | 3-1 | 0.08 | 28.7 | 21.5 |
| 6-10 | 2.12 | 3-1 | 0.16 | 29.6 | 22.5 |
| 6-11 | 2.12 | 3-2 | 0.04 | 28.8 | 24.3 |
| 6-12 | 2.12 | 3-2 | 0.08 | 28.3 | 22.5 |
| 6-13 | 2.12 | 3-2 | 0.16 | 29.6 | 22.7 |
| 6-14 | 2.12 | 3-9 | 0.04 | 30.3 | 22.2 |
| 6-15 | 2.12 | 3-9 | 0.08 | 34.5 | 22.8 |
| 6-16 | 2.12 | 3-9 | 0.16 | 34.3 | 22.6 |
| 6-17 | 2.12 | 3-12 | 0.04 | 29.3 | 19.8 |
| 6-18 | 2.12 | 3-12 | 0.08 | 30.3 | 20.2 |
| 6-19 | 2.12 | 3-12 | 0.16 | 30.7 | 23.2 |

TABLE 6B

Effect of anionic polyacrylamide molecular weight, architecture and its ratio in blend with polyvinylamine on dry Strength of recycled linerboard; Basesheet obtained from JinXin paper mill, made using Chinese old corrugated cardboard furnish, Basis Weight = 106 g/m², Caliper 6.3 mil, ExcelSize 15 = Oxidized Tapioca starch

| | | | | Strength data | |
|---|---|---|---|---|---|
| Examples | Starch (g/m²) | Additive | Addition (g/m²) | Mullen (lb/in²) | RCT (lb/6 in) |
| 6-20 | 2.12 | 2-2 | 0.04 | 30.2 | 20.0 |
| 6-21 | 2.12 | 2-2 | 0.08 | 33.2 | 22.6 |
| 6-22 | 2.12 | 2-2 | 0.16 | 31.8 | 21.6 |
| 6-23 | 2.12 | 3-14 | 0.04 | 30.5 | 21.4 |
| 6-24 | 2.12 | 3-14 | 0.08 | 32.8 | 21.2 |
| 6-25 | 2.12 | 3-14 | 0.16 | 32.5 | 23.4 |
| 6-26 | 2.12 | 2-1 | 0.04 | 30.5 | 22.4 |
| 6-27 | 2.12 | 2-1 | 0.08 | 29.3 | 15.4 |
| 6-28 | 2.12 | 2-1 | 0.16 | 24.6 | 16.6 |
| 6-29 | 2.12 | 3-13 | 0.04 | 24.7 | 18.8 |
| 6-30 | 2.12 | 3-13 | 0.08 | 27.0 | 19.0 |
| 6-31 | 2.12 | 3-13 | 0.16 | 26.9 | 17.8 |

Example 7

Utilizing the above described paper application method, blends of component A, polyacrylamide and component B, polyvinylamine were evaluated for effect on sheet strength using basesheets from a North American mill. All runs, except the 7-1, contained 4 g/m² ExcelSize 15 in the size press solution. In the case of stronger basesheets, as those used in this example, strength improvement requires higher addition levels of polymer and the degree of improvement is less than that observed for the weaker basesheet.

TABLE 7

Effect of acrylamide based additives on dry strength of recycled linerboard. Basesheet obtained from Green Bay Packaging paper, USA, made using American Old Corrugated Cardboard; Basis Weight = 198 g/m² ; Caliper = 11.5 mil; ExcelSize C155 = slightly cationic and oxidized Tapioca starch.

| | | | | Strength data | |
|---|---|---|---|---|---|
| Examples | Starch (g/m²) | Additive | Addition (g/m²) | Mullen (lb/in²) | RCT (lb/6 in.) |
| 7-1 No Starch | — | — | — | 57.5 | 97.6 |
| 7-2 | 4.00 | — | 0.00 | 71.7 | 114.6 |
| 7-3 | 4.00 | 3-15 | 0.30 | 77.4 | 123.6 |
| 7-4 | 4.00 | 3-15 | 0.60 | 73.1 | 124.1 |
| 7-5 | 4.00 | 3-16 | 0.30 | 68.9 | 118.9 |
| 7-6 | 4.00 | 3-16 | 0.60 | 74.2 | 121.9 |
| 7-7 | 4.00 | 3-7 | 0.30 | 73.2 | 119.2 |
| 7-8 | 4.00 | 3-17 | 0.30 | 70.4 | 122.4 |
| 7-9 | 4.00 | 3-17 | 0.60 | 75.2 | 125.6 |
| 7-10 | 4.00 | 3-18 | 0.30 | 75.5 | 121.7 |
| 7-11 | 4.00 | 3-18 | 0.60 | 73.9 | 124.1 |
| 7-12 | 4.00 | 3-19 | 0.30 | 74.6 | 118.5 |
| 7-13 | 4.00 | 3-19 | 0.60 | 73.1 | 122.2 |

Example 8

Mixtures of polyacrylamide and poly(diallyldimethyl ammonium chloride) (pDADMAC) (from Ashland Incorporated, Wilmington, Del.) or poly(allyl amine) (from SIGMA-ALDRICH, Milwaukee, Wis.) were prepared by mixing a polyacrylamide of example 1 with either of the above mentioned cationic polymers. In a typical experiment, a 4 oz. jar was charged with 100 g of polyacrylamide (PAM) solution, followed by addition of a cationic polymer solution. The mixture of polymers was stirred with a magnetic stir bar at ambient temperature for 1 hour.

TABLE 8

Type and ratio of copolymers employed to prepare a blend of polyacrylamide and cationic polymer.

| Example | Component A | Component B | Wt % |
|---|---|---|---|
| 8-1 | Example 1-2 | p(DADMAC) | 5.0 |
| 8-2 | Example 1-2 | p(DADMAC) | 10.0 |
| 8-3 | Example 1-2 | Poly(allyamine) | 5.0 |
| 8-4 | Example 1-2 | Poly(allylamine) | 10.0 |

Example 9

Utilizing the above described paper application method, a blend of polyacrylamide and various cationic polymers was evaluated for effect on sheet strength using basesheets from a North American mill. All runs, except the 9-1, contained 4 g/m² ExcelSize C155 in the size press solution. These examples demonstrate the utility of lower cost cationic polymers as components of this invention. Certain examples show that high levels of the coating composition cause diminished strength due to the impact on coating viscosity.

TABLE 9

Effect of acrylamide blend with cationic polymers on dry strength of recycled linerboard. Basesheet obtained from Green Bay Packaging paper, USA, made using American Old Corrugated Cardboard; Basis Weight = 198 g/m²; Caliper = 11.5 mil; ExcelSize 15 = Oxidized Tapioca starch.

| | | | | Strength data | |
|---|---|---|---|---|---|
| Examples | Starch (g/m²) | Additive | Addition (g/m²) | Mullen (lb/in²) | RCT (lbf/6 in.) |
| 9-1 No Starch | — | — | — | 61.6 | 96.5 |
| 9-2 | 4.00 | — | — | 71.7 | 114.6 |
| 9-3 | 4.00 | 1-2 | 0.30 | 78.8 | 117.2 |
| 9-4 | 4.00 | 8-1 | 0.15 | 80.0 | 119.0 |
| 9-5 | 4.00 | 8-1 | 0.30 | 77.2 | 118.9 |
| 9-6 | 4.00 | 8-1 | 0.60 | 78.9 | 120.0 |
| 9-7 | 4.00 | 8-3 | 0.15 | 85.8 | 121.8 |
| 9-8 | 4.00 | 8-3 | 0.30 | 79.2 | 119.4 |
| 9-9 | 4.00 | 8-3 | 0.60 | 81.8 | 124.3 |
| 9-10 | 4.00 | 8-2 | 0.15 | 73.3 | 115.4 |
| 9-11 | 4.00 | 8-2 | 0.30 | 79.9 | 116.1 |
| 9-12 | 4.00 | 8-2 | 0.60 | 78.5 | 120.5 |
| 9-13 | 4.00 | 8-4 | 0.15 | 78.5 | 114.3 |
| 9-14 | 4.00 | 8-4 | 0.30 | 76.6 | 116.9 |
| 9-15 | 4.00 | 8-4 | 0.60 | 76.3 | 120.8 |

Example 10

Mixtures of polyacrylamide and poly(acrylamide-co-[2-(Acryloyloxy)ethyl]trimethylammonium chloride) (Hercobond® 1200) or poly(acrylamide-co-acrylic acid-co-[2-(Acryloyloxy)ethyl]trimethylammonium chloride) (Hercobond® 1205) (both from Ashland Inc., Wilmington, Del.) were prepared by mixing a polyacrylamide of example 1 with either of the above mentioned cationic polymers. In a typical experiment, a 4 oz. jar was charged with 100 g of polyacrylamide (PAM) solution, followed by addition of a cationic polymer solution. The mixture of polymers was stirred with a magnetic stir bar at ambient temperature for 1 hour.

TABLE 10

Type and ratio of copolymers employed to prepare a blend of polyacrylamide and cationic polymer.

| Example | Component A | Component B | Wt % |
|---|---|---|---|
| 10-1 | Example 1-2 | Hercobond 1200 | 5.0 |
| 10-2 | Example 1-2 | Hercobond 1200 | 10.0 |
| 10-3 | Example 1-2 | Hercobond 1205 | 5.0 |
| 10-4 | Example 1-2 | Hercobond 1205 | 10.0 |

Example 11

Cationic polymers with quaternary functionality and amphoteric polymers blended with polyacrylamide as described in Example 10, were evaluated for strength performance utilizing the above described paper application method. All runs, except the 11-1, contained 4 g/m² ExcelSize 15 in the size press solution. These examples demonstrate the utility of cationic polymers containing quaternary amine functionality.

TABLE 11

Effect of acrylamide blend with cationic polymers on dry strength of recycled linerboard. Basesheet obtained from Green Bay Packaging paper, USA, made using American Old Corrugated Cardboard; Basis Weight = 198 g/m$^2$; Caliper = 11.5 mil; ExcelSize 15 = Oxidized Tapioca starch.

| Examples | Starch (g/m$^2$) | Additive | Addition (g/m$^2$) | Mullen (lb/in$^2$) | RCT (lbf/6 in.) |
|---|---|---|---|---|---|
| 11-1 No Starch | — | — | — | 61.6 | 96.5 |
| 11-2 | 4.00 | — | — | 71.7 | 114.6 |
| 11-3 | 4.00 | 3-7 | 0.20 | 76.0 | 121.3 |
| 11-4 | 4.00 | 3-7 | 0.40 | 73.5 | 122.3 |
| 11-5 | 4.00 | 10-1 | 0.20 | 79.2 | 122.0 |
| 11-6 | 4.00 | 10-1 | 0.40 | 74.3 | 123.7 |
| 11-7 | 4.00 | 10-2 | 0.20 | 77.4 | 119.8 |
| 11-8 | 4.00 | 10-2 | 0.40 | 78.4 | 123.8 |
| 11-9 | 4.00 | 10-3 | 0.20 | 81.0 | 120.9 |
| 11-10 | 4.00 | 10-3 | 0.40 | 77.3 | 124.9 |
| 11-11 | 4.00 | 10-4 | 0.20 | 74.4 | 121.1 |
| 11-12 | 4.00 | 10-4 | 0.40 | 78.8 | 121.8 |

The invention claimed is:

1. A coating composition for a formed paper substrate comprising:
    component A selected from the group consisting of a polyacrylamide having less than 5 molar percent anionic functionality; component B selected from the group consisting of a cationic polymer wherein the cationic polymers have charge densities, on a solids basis, in the range of 1.00 to 12.00 meq/g; and starch wherein the ratio of component A to component B is from 99:1 to 80:20; and wherein the ratio of component A plus component B to starch is from 1:105 to 1:1.

2. The coating composition of claim 1 wherein component B is prepared from a vinyl or allyl monomer bearing amine functionality.

3. The coating composition of claim 1 wherein component A is prepared from monomers wherein at least one monomer is selected from the group consisting of acrylamide, methacrylamide, N-methyl(meth)acrylamide, N-ethyl(meth)acrylamide, N,N-dimethyl(meth)acrylamide, and N-isopropyl (meth)-acrylamide.

4. The coating composition of claim 1 wherein component A is prepared from monomers wherein at least one monomer is selected from the group consisting of acrylic acid, methacrylic acid, 2-acrylamido-2-methylpropane sulfonic acid, 4-styrenesulfonic acid, and 4-vinylbenzoic acid and their salts.

5. The coating composition of claim 1 wherein component B is prepared from monomers wherein at least one monomer is selected from the group consisting of dimethylaminoethyl (meth)acrylate, diethylaminoethyl (meth)acrylate, dimethylaminopropyl (meth)acrylate, diethylaminopropyl (meth)acrylate, [2-(Methacryloyloxy) ethyl]trimethylammonium chloride, [3-(Methacryloylamino) propyl]trimethylammonium chloride, [2-(Acryloyloxy) ethyl]trimethylammonium chloride, [3-(Acryloyloxy) propyl]trimethylammonium chloride, N,N-dimethylamino propyl(meth)acrylamide, dialkyldiallylamine, diallylamine, dialkylallylamine, and allylamine.

6. The coating composition of claim 5 wherein component B is additionally prepared from at least one monomer selected from the group consisting of acrylamide, (meth)acrylamide, N-methyl (meth)acrylamide, N-ethyl (meth)acrylamide, and N-isopropyl (meth)acrylamide.

7. The coating composition of claim 1 wherein component B comprises the hydrolyzed product of a polymer prepared from at least one monomer from the group consisting of N-vinyl formamide, N-vinyl acetamide, and vinyl N-phthalimide.

8. The coating composition of claim 1 wherein component B comprises a vinylamine containing polymer.

9. The coating composition of claim 1 wherein component A is cross linked with a monomer selected from the group consisting of ethylene glycol di(meth)acrylate, diethyleneglycol di(meth)acrylate, methylenebisacrylamide, methylene-bis-(meth)acrylamide, ethylene-bis-(meth)acrylamide, and hexamethylene-bis-(meth)acrylamide.

10. The coating composition of claim 1 wherein component B is cross linked with a monomer selected from the group consisting of ethylene glycol di(meth)acrylate, diethyleneglycol di(meth)acrylate, methylenebisacrylamide, methylene-bis-(meth)acrylamide, ethylene-bis-(meth)acrylamide, and hexamethylene-bis-(meth)acrylamide.

11. The coating composition of claim 1 wherein the molecular weight of component A is from 30,000 to about 300,000 Daltons.

12. The coating composition of claim 1 wherein the molecular weight of component B is from 50,000 to about 600,000 Daltons.

13. The coating composition of claim 1 wherein the starch is selected from the group consisting of unmodified or modified corn starch, rice starch, potato starch, wheat starch, and tapioca starch.

14. The coating composition of claim 1 wherein the viscosity of the composition is less than 1000 centipoise at a temperature of 60° C.

15. A process for making paper with improved dry strength, the process comprising applying to already formed paper a composition, comprising: component A selected from the group consisting of a polyacrylamide having less than 5 molar percent anionic functionality, component B selected from the group consisting of a cationic polymer wherein the cationic polymers have charge densities, on a solids basis, in the range of 1.00 to 12.00 meq/g, and starch; wherein the ratio of component A to component B is from 99:1 to 80:20; and wherein the ratio of component A plus component B to starch is from 1:105 to 1:1.

16. The process of claim 15 wherein component B is prepared from a vinyl or allyl monomer bearing amine functionality, wherein the molecular weight of component A is from 30,000 to about 300,000 Daltons, wherein the molecular weight of component B is from 50,000 to about 600,000 Daltons, and wherein the viscosity of the composition is less than 1000 centipoise at a temperature of 60° C.

17. The process of claim 16 wherein component B comprises a vinylamine containing polymer and wherein component A is anionic.

* * * * *